United States Patent Office 3,547,500
Patented Dec. 15, 1970

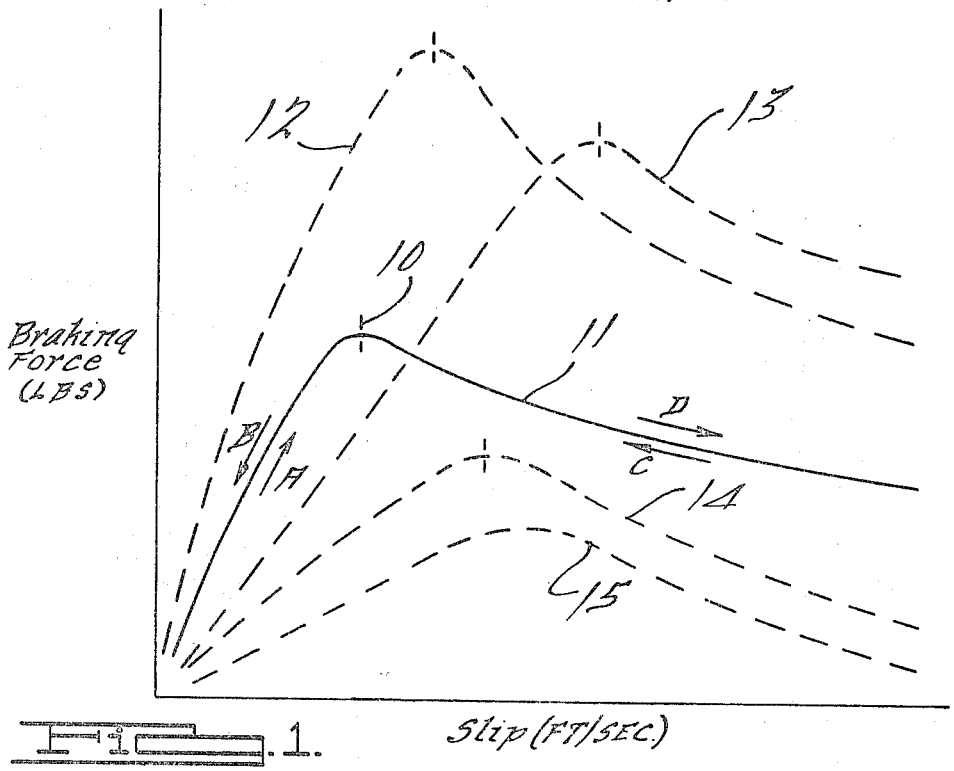
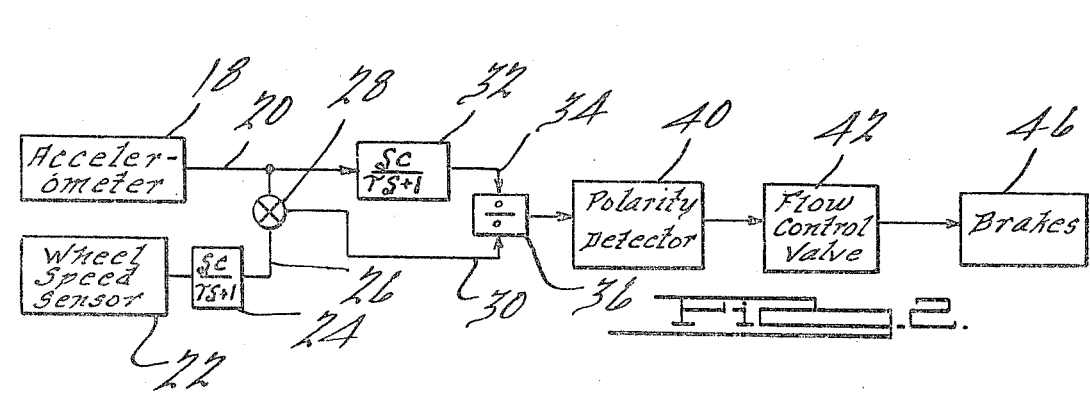
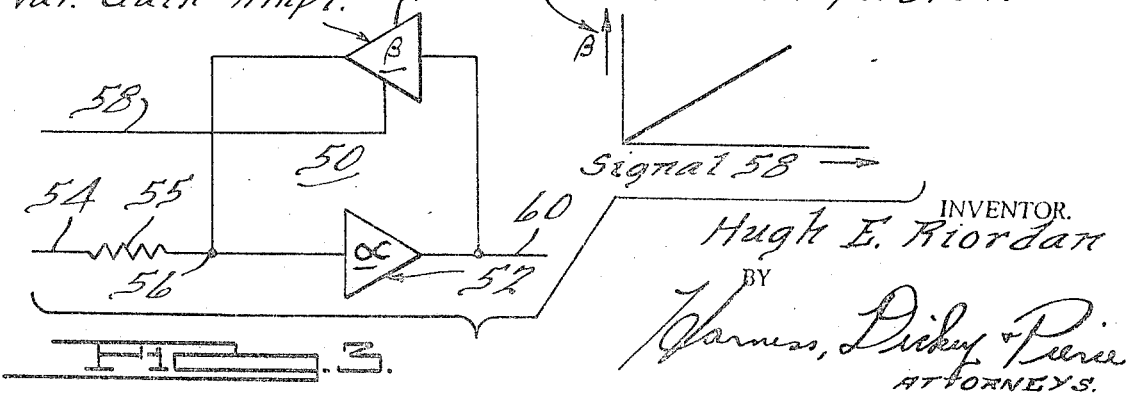
INVENTOR.
Hugh E. Riordan
BY
Barnes, Dickey & Pierce
ATTORNEYS.

3,547,500
SKID CONTROL SYSTEM
Hugh E. Riordan, Ann Arbor, Mich., assignor to Kelsey-Hayes Company, Romulus, Mich., a corporation of Delaware
Filed Mar. 6, 1969, Ser. No. 804,752
Int. Cl. B60t 8/10
U.S. Cl. 303—21                                           6 Claims

ABSTRACT OF THE DISCLOSURE

A system for controlling the braking of a wheeled vehicle to control skidding in which the braking effect applied to the vehicle wheel is effectively responsive to changes in polarity of a control signal representative of the rate of change of the braking force as a function of wheel slip so that such rate of change is maintained substantially at or near zero during the braking operation under all road conditions.

BACKGROUND AND SUMMARY OF THE INVENTION

This invention relates generally to vehicle braking systems and, more particularly, to braking control means for controlling wheel skid and minimizing stopping distances while simultaneously maintaining directional stability.

For purposes of describing the system of this invention, the term "slip" refers to a characteristic of the rotative element whereby the element rotates at less than its free rolling speed when a braking force or torque is applied. The term "skid," or "slide" refers to a locked wheel condition.

One of the major difficulties which arises in braking a moving vehicle, such as an automobile, aircraft or other wheeled vehicle, occurs when the braking wheel, or wheels, skid or slide, the skidding or sliding tending to create an unstable condition in the controlled motion of the vehicle. Wheel skidding or sliding may cause such a loss in directional stability as to result in an uncontrolled skidding or sliding while at the same time generally increasing the distance required to bring the vehicle to a stop due to a reduced coefficient of friction while in the skidding or sliding condition. Under most road conditions, if skidding can be prevented, the vehicle can usually be stopped more safely in a shorter distance.

A skid control system has been evolved which is effective to control braking under various road conditions. This system utilizes a relatively simple computational system which takes into account changing road conditions which result in a change in the coefficient of friction. The system, disclosed in copending application of Ronald S. Scharlack, Ser. No. 626,626, filed Mar. 28, 1968 for "Anti-Skid Braking System," senses the linear and angular acceleration of the braking wheel, or wheels, by appropriate accelerometer devices. The output signals from such accelerometers are fed to a computer system which produces output signals proportional to the rate of change in the braking force as a function of time and the rate of change the wheel slip as a function of time. The system senses changes in polarities of these output signals to produce an ultimate output signal for controlling the braking system and providing optimum operation of the overall braking system at the most efficient point. In this way, a minimum rate of change of braking force as a function of slip, and preferably a zero change, is utilized to control the braking system and produce optimum performance.

While the aforementioned invention operates extremely well to achieve the aforementioned results, it has been found that further simplification of this system may be accomplished while achieving the same results. Accordingly, the system of the present invention utilizes the same principles disclosed in the aforementioned copending application, the ultimate results being achieved by a circuit which senses the vehicle slip and the rate of change of tractile force as a function of vehicle slip and correlating these two signals to generate an ultimate output signal for controlling the braking system.

Accordingly, it is one of the objects of the present invention to provide an improved system for operating the brake or brakes of a wheeled vehicle.

It is another object of the present invention to provide an improved skid control system for the brake or brakes of a wheeled vehicle.

It is a further object of the present invention to provide an improved brake control system of the type described which is capable of eliminating skidding or sliding of the braked wheel by sensing the linear acceleration of the vehicle and the angular velocity of the wheel.

It is still further an object of the present invention to provide an improved skid control system for the brake of a vehicle which is simple and inexpensive to manufacture and install, and is reliable in use.

Further objects, features and advantages of this invention will become apparent from a consideration of the following description, the appended claims and the accompanying drawing, in which:

FIG. 1 is a graph illustrating a family of typical performance curves depicting the change in braking force as a function of slip for varying road conditions;

FIG. 2 illustrates a diagram of a preferred form of the control system of the present invention; and FIG. 3 is a schematic diagram illustrating a preferred form of divisor amplifier which may be utilized in conjunction with the system of the present invention.

FIG. 1 shows a family of typical performance curves 11 through 15 for a rubber tired vehicle under braking conditions, these curves representing the change in braking force F as a function of slip S under a plurality of different road conditions. The curves are merely representative of the general shape of performance curves and are not meant to depict any actual absolute values of force or slip of any particular wheel configurations.

With reference to FIG. 1, the braking force can be defined as the force tangential to the wheel at its contact point with the surface, which force is equal to the braking torque applied to the wheel divided by the wheel radius. The braking force is dependent upon coefficient of friction between the wheel and the surface of the contact point between them. As can be seen in FIG. 1, each of the curves has substantially the same general shape and each has a single maximum point indicating by a short vertical line approximately placed on each curve. With reference to the particular performance curve 11, selected for purposes of illustration, such "force-slip" curve has a single maximum point 10 at which the rate of change of the force as a function of slip, i.e., the slope or $dF/dS$, is zero.

The primary purpose of the skid control system of the present invention is to maintain the system operation about the maximum point, such as point 10 on the force-slip performance curve applicable to the particular road conditions which exist. Again, it is to be noted that this point occurs where the rate of change of braking force as a function of slip is at or substantially near zero. This operation provides a maximum braking rate and high vehicle stability. If, for example, the system is caused to operate a point on that portion of the curve to the right of point 10, the slip S exceeds the value it has at point 10 and may tend to increase to a value where skidding or sliding occurs. If the system operating point is on that portion of the curve to the left of point 10, the braking force and, hence, the efficiency drops off rapidly, and stopping distance considerably increases.

Curve 11 in FIG. 1 represents a performance curve for a specific set of road conditions, i.e., where the coefficient of friction has a specific value. Each of the other curves of the family represents operations at different coefficient of friction in accordance with different road conditions. Since the system of the invention effectively responds to the polarity, or sign of the quantity $dF/dS$ and not to its absolute value, as discussed below, operation can be maintained about the maximum point of the applicable curve and the system will operate at maximum efficiency under all road conditions.

As stated above, the greatest braking efficiency is obtained at point 10 and, if operation is to be maintained about that point, the control signal applied to the braking sytem must differ when operation occurs on that portion of the curve to the right of point 10 from that when operation occurs on that portion of the curve to the left of point 10. As can be seen in the figure, the slope $dF/dS$ of curve 11 is negative to the right of point 10 and is positive to the left of point 10 while, as indicated above, the slope of point 10 is zero. Thus, if the polarity of the quantity $dF/dS$ (the slope of the curve 11) is effectively determined, a suitable control signal can be generated to maintain braking operation at the maximum point of the force-slip performance curve.

Accordingly, the slope of $dF/dS$ to the left of point 10, being positive, dictates that the braking force be maintained to drive the system toward the point 10 on the curve. The maintaining of the braking force will cause the operation of the system to follow the particular curve (for example 11, 12, 13, 14 or 15) dictated by the particular road conditions encountered until the point 10 is reached, at which time the polarity of the slope reverses and becomes minus. Under these conditions, the braking force is reduced to permit the system to again approach point 10 from the opposite or right side. This action of oscillating about point 10 continues until the vehicle comes to a stop or the operator removes brake pressure.

In systems of this type, the braking force is determined in accordance with the following equation:

$$\tau_b = K_b P_b \qquad (1)$$

where $\tau_b$ is a braking force, $K_b$ is the braking coefficient and $P_b$ is the brake pressure.

Tractive force ($F_t$) can be expressed by the following equation:

$$F_t = K_{s_1} V_s - K_{s_2} V_s^2 \qquad (2)$$

over the range of $V_s(Vv-Vw)$, from zero to some predetermined point to the right of point 10 on the graph of FIG. 1, $K_{s_1}$ and $K_{s_2}$ being slip constants and $V_s$ the slip velocity defined by the equation:

$$V_s = (Vv - Vw) \qquad (3)$$

where $Vv$ is the vehicle speed and $Vw$ is the tangential speed of the wheel. Also, the tractive force may be defined by the equation:

$$m\ddot{X} = -F_t \qquad (4)$$

where $m$ is mass and $\ddot{X}$ is the linear acceleration of the machine.

Also, the torque on the wheel can be defined by the following expression:

$$\tau w \ddot{\theta} = rF_t - K_b P_b \qquad (5)$$

where $\tau w$ is the moment of inertia on the wheel, $\ddot{\theta}$ is the angular acceleration and $r$ is the radius of the wheel.

In the control system of the present invention, the brake pressure is controlled in such a way as to cause $dF_t/dV_s$ to remain in the vicinity of zero, this zero slope of the curves of FIG. 1 being approached in the system from either direction illustrated as A and C in FIG. 1, either in the acceleration or spin-up mode of the wheel or the deceleration or run-down mode of the wheel respectively. This condition places the traction force at the peak value or point 10 of the graph of FIG. 1. Clearly, the most direct measurement of $F_t$ is obtained by sensing vehicle acceleration, this fact being obvious from the expression of Equation No. 4.

Accordingly, the quantity $dF_t/dV_s$ may be expressed as follows:

$$\frac{dF_t}{dt} \Big/ \frac{dV_s}{dt} = \frac{dF_t}{dV_s} \qquad (6)$$

The expression $dV_s/d_t$ may be defined by differentiating Equation 3 to arrive at the equation:

$$\frac{dV_s}{dt} = \ddot{X} - r\ddot{\theta} \qquad (7)$$

Further, by differentiating Equation 4, the expression for the rate of change of tractile force with respect to time may be derived as follows:

$$\frac{dF_t}{dt} = -m\dddot{X} \qquad (8)$$

Combining Equations 7 and 8 by substituting the quantities in Equation 6, the expression for the rate of change of tractile force with respect to slip velocity is obtained as follows:

$$\frac{dF_t}{dV_s} = \frac{-m\dddot{X}}{\ddot{X} - r\ddot{\theta}} \qquad (9)$$

For constant slip, $\ddot{X} \equiv r\ddot{\theta}$ and this Equation 9 is completely indeterminate. Therefore, it is necessary to examine the sign of Equation 9 in the vicinity of the maximum of the slip curve. Accordingly, introducing brake pressure, the following expressions are derived by substituting Equation 4 in Equation 5.

$$\tau_w \ddot{\theta} = -m\ddot{X}r - K_b P_b \qquad (10)$$

or $$\ddot{\theta} = \frac{-mr}{\tau w} \ddot{X} - \frac{Kb}{\tau w} Pb \qquad (11)$$

Substituting Equation 11 in Equation 9 provides the following expression for the rate of change of tractile force with respect to slip.

$$\frac{dF_t}{dV_s} = \frac{-m\dddot{X}}{\ddot{X}\left[1 + \frac{mr^2}{\tau w}\right] + \frac{K_b P_b r}{\tau w}} \qquad (12)$$

by differentiating Equation 2, the following expression is obtained:

$$\frac{dF_t}{dV_s} = K_{s_1} - 2K_{s_2} V_s = K_{s_1} - 2K_{s_2}(\dot{X} - r\dot{\theta}) \qquad (13)$$

Solving 12 for $P_b$ produces the following expression:

$$\frac{rK_b}{\tau w} P_b = \frac{-m\dddot{X}}{\left[\frac{dF_t}{dV_s}\right]} - \ddot{X}\left[1 + \frac{mr^2}{\tau w}\right] \qquad (14)$$

Substituting Equation 13 in Equation 14

$$P_b = \frac{\tau w}{K_b} \left\{ \frac{-m\dddot{X}}{K_{s_1} - 2K_{s_2}(\dot{X} - r\dot{\theta})} - \ddot{X}\left[1 + \frac{mr^2}{\tau_w}\right] \right\} \qquad (15)$$

Equating the right portion of Equation 9 to the right portion of Equation 13 yields:

$$\frac{-m\dddot{X}}{\ddot{X} - r\ddot{\theta}} = K_{s_1} - 2K_{s_2}(\dot{X} - r\dot{\theta}) \qquad (16)$$

Rearranging Equation 16

$$-m\dddot{X} = [\ddot{X} - r\ddot{\theta}][K_{s_1} - 2K_{s_2}(\dot{X} - r\dot{\theta})] \qquad (17)$$

Examination of Equation 12 illustrates that for the finite values of $\ddot{X}$ and $P_b$, $dF_t/dV_s$ can only be zero (the desired operating point on the curve of FIG. 1) if $\ddot{X}$ is zero. Hence, equating expression (17) to zero, and ignoring the indeterminate case when $r\dot{\theta} = \dot{X}$, the following expression results:

$$K_{s_1} - 2K_{s_2}(\dot{X} - r\dot{\theta}) = 0 \qquad (18)$$

Rearranging, Equation 18 yields $$(\dot{X} - r\dot{\theta}) = \frac{K_{s_1}}{2K_{s_2}} \qquad (19)$$

Unfortunately $K_{s/1}$ and $K_{s/2}$ cannot be measured on the vehicle directly under certain conditions. Therefore, Equations 18 and 19 cannot be used for control of slip. It is now necessary to compute the value of $P_b$ which results in the conditions of Equation 19 in order to operate at or near the optimum point described in conjunction with the description of FIG. 1. Since, at a stable condition of constant slip $\ddot{X} = r\ddot{\theta}$, we can compute $P_b$ from Equation 11.

Thus:

$$P_b = \ddot{\theta}\left(r\frac{2m}{K_b} + \tau w\right) \qquad (20)$$

or alternatively, $$P_b = \frac{\ddot{X}}{r}\left(\frac{r^2m + \tau w}{\ddot{X}K_b}\right) \qquad (21)$$

Note that $P_b$ is uniquely defined, under constant slip conditions, by either the vehicle deceleration or the wheel deceleration; however, there is no directly measurable relationship between $P_b$ and the value of slip.

As noted above, $\ddot{X} \equiv r\ddot{\theta}$ for constant slip and Equation 9 is completely indeterminate. It is therefore necessary to examine the sign of Equation 9 in the vicinity of the maximum of the slip curve of FIG. 1 and control the brake pressure $P_b$ in such a way to drive $F_t$ toward the peak in the curve from either direction. This requires that the control logic be executed as follows:

when $\left|\frac{dF_t}{dV_s}\right| = \left|\frac{m\ddot{X}}{\ddot{X} - r\ddot{\theta}}\right| > 0, \frac{dP_b}{dt} > 0 \qquad (22)$ $\left|\frac{dF_t}{dV_s}\right| = \left|\frac{m\ddot{X}}{\ddot{X} - r\ddot{\theta}}\right| < 0, \frac{dP_b}{dt} < 0 \qquad (23)$ Referring now to FIG. 2, there is illustrated a preferred system 16 for carrying out features of the present invention. The logic system 16 of FIG. 2 is capable of producing an output control signal which has a first value under operating conditions of the vehicle which would indicate that the vehicle was in the region on the force-slip curve to the left of point 10 and a second value if the conditions of the vehicle indicate that the vehicle is operating to the right of point 10 or in a high slip condition. This output control signal is utilized to control a solenoid valve to control the hydraulic portion of skid control system such as that illustrated in an application of William Stelzer, U.S. Case No. 324, Ser. No. 765,787 filed Oct. 8, 1968 for Skid Control System or application of William Stelzer, U.S. Case No. 337, Ser. No. 763,088 filed Sept. 27, 1968 for Fluid Actuated Vehicle Brake System incorporating Skid Control, or other suitable electrically controlled means of modulating brake pressure.

From Equations 22 and 23 it is seen that the linear acceleration of the vehicle must be sensed and compared to the difference between a vehicle velocity and the angular acceleration of the wheel, or the slip. In the system of FIG. 2, an accelerometer 18 is provided which generates an output signal on conductor 20, this signal varying in accordance with the linear acceleration of the vehicle wheel. The angular velocity of the wheel is sensed by a wheel speed sensor device 22 and a signal indicative of the angular acceleration of the wheel is generated in response to the wheel speed by means of a differentiator circuit 24, the differentiator circuit 24 operating in accordance with the mathematical expression within the block 24. The output signal from the differentiator circuit 24 is fed, by means of a conductor 26, to a summing network 28, the summing network 28 generating an output signal on conductor 30 which varies in accordance with the difference between the signal impressed on the conductor 20 by the accelerometer 18 and the signal generated on the conductor 26 by the differentiator 24. Thus, the output signal on the conductor 30 is proportional to the expression $\ddot{X} - r\ddot{\theta}$.

On the other hand, the output signal impressed on conductor 20 is also fed to a second differentiator circuit 32, the circuit 32 generating a signal which corresponds to the rate of change of acceleration which corresponds to the rate of change with time of the signal generated on conductor 20. It is to be noted that the differentiator 32 operates in a manner similar to the differentiator 24. The output of differentiator 32 is fed, by means of a conductor 34, to an amplifier circuit 36, the gain of which is proportional to the input from conductor 34 divided by input from conductor 30. Thus, the output of amplifier 36 is proportional to the expression $$\frac{m\dddot{X}}{\ddot{X} - r\ddot{\theta}}$$

It is this signal which corresponds to the expressions 22 and 23 described above, the polarity of which will indicate the direction of approach and achievement of the vehicle reaching point 10 of the curves described in conjunction with FIG. 1.

Finally, the output of amplifier 36 is fed to a polarity detector circuit 40 which senses the polarity of the output signal from amplifier 36 and generates an output control signal for controlling the operation of a flow control valve 42, thus controlling the operation of the brake system designated 46. As stated above, the flow control valve may be of the type incorporated into either of the above referenced Stelzer applications which have the characteristic that operator establishes an initial brake pressure, and this brake pressure is subsequently modulated by the control system in accordance with the sensing of a skidding or sliding condition to decrease the braking force. With the skidding or sliding condition alleviated, the brake pressure is again applied up to the maximum pressure initially established by the operator. This operation continues until the brakes are completely released by the operator or the vehicle is brought to a halt.

Referring now to FIG. 3, there is illustrated one type of amplifier circuit 50 which may be utilized in the block designated 36 described in conjunction with FIG. 2. Specifically, the circuit includes an amplifier 52 having an input conductor 54 for providing an input signal to the amplifier 52. The conductor 54 is connected to the amplifier 52 through a resistor 55 and a node 56. The output of the circuit 50 is derived at output conductor 60, the conductor 60 also being connected to the input circuit of a variable gain feedback amplifier 62, the output characteristics of which are illustrated on the right side of FIG. 3.

In operation, the rate of change of acceleration signal generated on conductor 34 of FIG. 2, is fed to input conductor 54 and the difference between the linear acceleration and the angular acceleration on conductor 30 is fed to the input conductor 58. It is to be noted that the signal on conductor 30 is directly proportional to the slip velocity defined above in connection with Equation No. 3. The divider amplifier gain is determined by the transfer function of the fed back variable gain amplifier which in this case is the circuit connected to input conductor 58, or the rate of change of linear acceleration divided by the rate of change of slip velocity. The gain of the amplifier circuit 50 is then equal to alpha over 1 plus alpha times beta or $$G = \frac{\alpha}{1+\alpha\beta} = \frac{1}{1/\alpha + \beta}$$

This expression is approximately equal to 1 over beta $$\left(\frac{1}{\beta}\right)$$

Thus, the gain of the amplifier circuit 36 or 50 is equal to the magnitude of the input signal on conductor 34 or 54 divided by magnitude of input signal on conductor 30 or 58.

first signal, said control signal varying as a function of said rate signal divided by said resultant signal.

2. The improvement of claim 1 wherein said second signal generating means includes wheel speed sensor means and differentiator means for generating a rate of change of wheel speed signal.

3. The improvement of claim 1 wherein said correlating means includes a summing circuit and said difference signal is said first signal less said second signal.

4. The improvement of claim 1 further including output amplifier means including feed back means for varying the output control signal in accordance with the rate of change of acceleration divided by the rate of change

PO-1050
(5/69)

UNITED STATES PATENT OFFICE
CERTIFICATE OF CORRECTION

Patent No. 3,547,500                         Dated December 15, 1970

Inventor(s)  Hugh E. Riordan

It is certified that error appears in the above-identified patent and that said Letters Patent are hereby corrected as shown below:

Column 4, line 15, "$dV_s/d_t$" should be -- $dV_s/dt$ --; Equation 11, "$\ddot{\Theta} = \frac{-mr}{\mathcal{J}w} \dot{X} - \frac{Kb}{\mathcal{J}w} Pb$" should be -- $\ddot{\Theta} = \frac{-mr}{\mathcal{J}w}\ddot{X} - \frac{K_b}{\mathcal{J}w} P_b$ --; Equation 14

"$\frac{rK_b}{\mathcal{J}w} P_b = \frac{-m\ddot{X}}{\left[\frac{dF_t}{dV_s}\right]} = \dot{X}\left[1+\frac{mr^2}{\mathcal{J}w}\right]$" should be -- $\frac{rK_b}{\mathcal{J}w} P_b = \frac{-m\ddot{X}}{\left[\frac{dF_t}{dV_s}\right]}$ $-\ddot{X}\left[1+\frac{mr^2}{\mathcal{J}w}\right]$ --; Equation 15, " $P_b = \frac{\mathcal{J}w}{K_b}\left\{\frac{-m\ddot{X}}{K_{s_1}-2K_{s_2}(\dot{X}-r\dot{\Theta})} - \ddot{X}\left[1+\frac{mr^2}{\mathcal{J}w}\right]\right.$ should be -- $P_b + \frac{\mathcal{J}w}{K_b}\left\{\frac{-m\ddot{X}}{K_{s_1}-2K_{s_2}(\dot{X}-r\dot{\Theta})} - \ddot{X}\left[1+\frac{mr^2}{\mathcal{J}w}\right]\right\}$ --. Column 5, line 15, "$K_{s/1}$ and $K_{s/2}$" should be -- $K_{s_1}$ and $K_{s_2}$ --; line 22 "$\ddot{X} = r\Theta$" should be -- $\ddot{X} = r\ddot{\Theta}$ --; Equation 20, " $P_b = \dot{\Theta}\left(r\frac{2m}{K_b} + \mathcal{J}w\right)$" should be -- $P_b = \ddot{\Theta}\left(r\frac{2m}{K_b} + \mathcal{J}w\right)$ --. Column 6, line 72, "fed back" should be --feed back--.

Signed and sealed this 6th day of July 1971.

(SEAL)
Attest:

EDWARD M. FLETCHER, JR.          WILLIAM E. SCHUYLER, JR.
Attesting Officer                Commissioner of Patents